F. STITZEL.
SPRING WHEEL.
APPLICATION FILED MAR. 21, 1913.

1,114,930.

Patented Oct. 27, 1914.

WITNESSES

INVENTOR
Frederick Stitzel

UNITED STATES PATENT OFFICE.

FREDERICK STITZEL, OF LOUISVILLE, KENTUCKY.

SPRING-WHEEL.

1,114,930.  Specification of Letters Patent.  Patented Oct. 27, 1914.

Application filed March 21, 1913. Serial No. 756,009.

*To all whom it may concern:*

Be it known that I, FREDERICK STITZEL, a citizen of the United States, residing at Louisville, in the county of Jefferson and State of Kentucky, have invented a certain new and useful Improvement in Spring-Wheels, of which the following is a full, clear, and exact description.

This invention relates to that type of spring wheels for vehicles, in which there is an inner wheel member having the hub, spokes and a rim, and an outer wheel member having the felly and tire, and these two members connected in a yielding manner by means of transversely arranged springs or resilient bodies so disposed that as the inner member moves under a load, the springs or resilient bodies will serve to cushion the wheel.

The invention consists of coiled metallic springs, or other resilient bodies interposed in suitable movable housings between the periphery of the inner member and the outer member, so as to be compressed and thus cushion the wheel as the load is distributed upon it, as I will proceed now to explain and finally claim.

Figure 1:
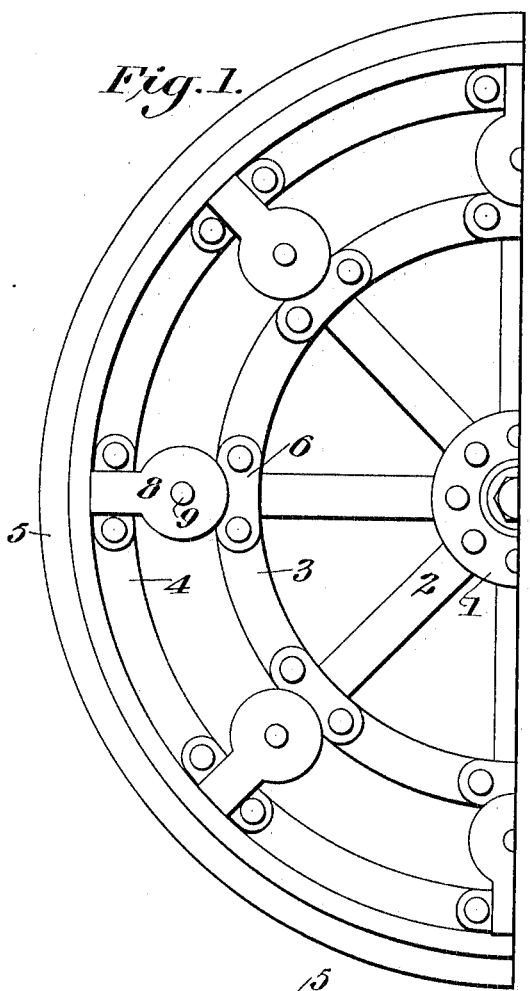
Figure 2:
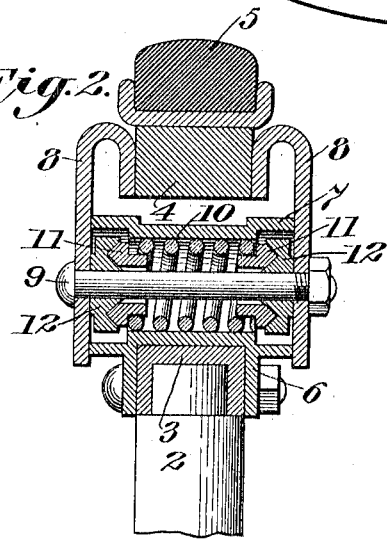

In the accompanying drawings illustrating the invention, in the several figures of which like parts are similarly designated, Figure 1 is an elevation of half of a wheel showing the metallic spring construction, and Fig. 2 is a cross-section, on a larger scale, through one of the spring connections.

The hub 1, spokes 2 and rim 3 may be of any approved construction, and these parts constitute the inner wheel member, herein referred to as the inner member. The felly 4 and tire 5 likewise may be of any approved construction, and they constitute the outer wheel member, herein referred to as the outer member. The inner member and the outer member are wholly separate, excepting for the yielding connections next described.

The rim of the inner member has bolted or otherwise applied to it, the housings 6, extending radially therefrom and including the transverse tubular portions 7, and the outer member has the pairs of hangers 8, of more or less springy nature, bolted or otherwise applied thereto and projecting therefrom toward the housings 6 and overlapping the tubular portions of the housings and closing them. These pairs of hangers equal in number the number of housings employed, and they are connected with them by bolts 9 extending through the hangers and the tubular portions of the housings. Within the tubular portions 7 are compression springs 10, and fitted in and supporting the ends of these springs are the conically or cam faced tubular bearing pieces 11, with which coöperate the complementary grooved disks or cam members 12. The bearing pieces fit loosely on the bolts 9, but the disks 12 fit these bolts closely.

It will be observed that the conical centers of the disks 12 are higher than the rims thereof and as the inner wheel moves under the load, the conically faced bearing pieces 11 ride upon these conical centers and upon the bevels of the rims of the grooved disks and move the bearing pieces toward each other, thereby further compressing the springs and exercising their power to sustain the load on the wheel while cushioning the wheel.

As will be understood the spring or resilient elements serve to cushion the wheel as it moves.

Variations in the form and relative arrangement of the component parts of the wheel are permissible within the spirit of the invention.

What I claim is:—

1. A spring wheel, having an inner member and an outer member, connections between these members, including a series of housings on one of the members and a coacting series of hangers on the other member, the housings having tubular portions, springs arranged transversely therein, conical bearing pieces, mounted in and supported by the springs, bolts passing through and connecting said housings, hangers and springs transversely, and grooved disks to match said conical bearing pieces mounted on and carried by said bolts.

2. A spring wheel, having an inner member and an outer member, and means to connect these members at intervals, comprising housings, springs arranged transversely therein and provided with conical tubular bearing pieces, complementary grooved disks matched to said conical bearing pieces, hangers overlapping the housings and closing the ends of their tubular portions, and transverse bolts connecting the hangers and housings and on which the grooved disks are fixed.

In testimony whereof I have hereunto set my hand this nineteenth day of March, A. D. 1913.

FREDERICK STITZEL.

Witnesses:
GEORGE MERCKE,
KATIE WELSH.

Copies of this patent may be obtained for five cents each, by addressing the "Commissioner of Patents, Washington, D. C."